United States Patent [19]

Flower

[11] 4,338,266

[45] Jul. 6, 1982

[54] DEVICE FOR CONDITIONING AIR WITH IMPROVED GAS-LIQUID CONTACT PAD

[75] Inventor: John W. Flower, Madison, Wis.

[73] Assignee: Research Products Corporation, Madison, Wis.

[21] Appl. No.: 251,998

[22] Filed: Apr. 8, 1981

[51] Int. Cl.³ ............................................... B01F 3/04
[52] U.S. Cl. ..................................... 261/94; 62/304; 261/106; 261/112; 261/DIG. 3
[58] Field of Search ................... 261/94, 112, DIG. 3, 261/113, 103, 106, DIG. 11; 55/489, 525; 62/304

[56] References Cited

U.S. PATENT DOCUMENTS

| | | | |
|---|---|---|---|
| 1,895,642 | 1/1933 | Preble | 55/525 X |
| 2,443,238 | 6/1948 | Glanzer | 55/489 X |
| 2,470,652 | 5/1949 | Scofield | 261/94 |
| 2,493,726 | 1/1950 | O'Day | 55/489 X |
| 2,611,298 | 9/1952 | Rowe | 493/364 |
| 2,637,540 | 5/1953 | Rowe | 261/94 |
| 2,955,064 | 10/1960 | Frohmader | 261/94 X |
| 3,010,706 | 11/1961 | McWilliams | 261/94 X |
| 3,193,259 | 7/1965 | Liebmann | 261/24 |
| 3,346,246 | 10/1967 | Loetel et al. | 261/DIG. 11 |
| 4,304,738 | 12/1981 | Nutter | 261/94 |

FOREIGN PATENT DOCUMENTS

| | | | |
|---|---|---|---|
| 734874 | 8/1955 | United Kingdom | 261/94 |
| 752026 | 7/1956 | United Kingdom | 55/489 |
| 977752 | 12/1964 | United Kingdom | 261/94 |

*Primary Examiner*—Richard L. Chiesa
*Attorney, Agent, or Firm*—Andrus, Sceales, Starke & Sawall

[57] ABSTRACT

A device for conditioning air has a pad formed of a plurality of layers of slit and expanded media, with the pad having a plurality of groups of layers therewithin. Each layer within a particular group of layers has its baffles oriented to face in the same direction, while each group is turned around to face in the opposite direction from its directly adjacent group so that the baffles of one group face oppositely to the baffles of the next adjacent group. Alternate layers within each group are expanded to a slightly different degree so that the various elements making up each layer support the elements of adjacent layers in spaced unnested relationship. The dimensions of the expanded cells are substantially greater than those of known prior pads to better accommodate higher air velocities.

7 Claims, 5 Drawing Figures

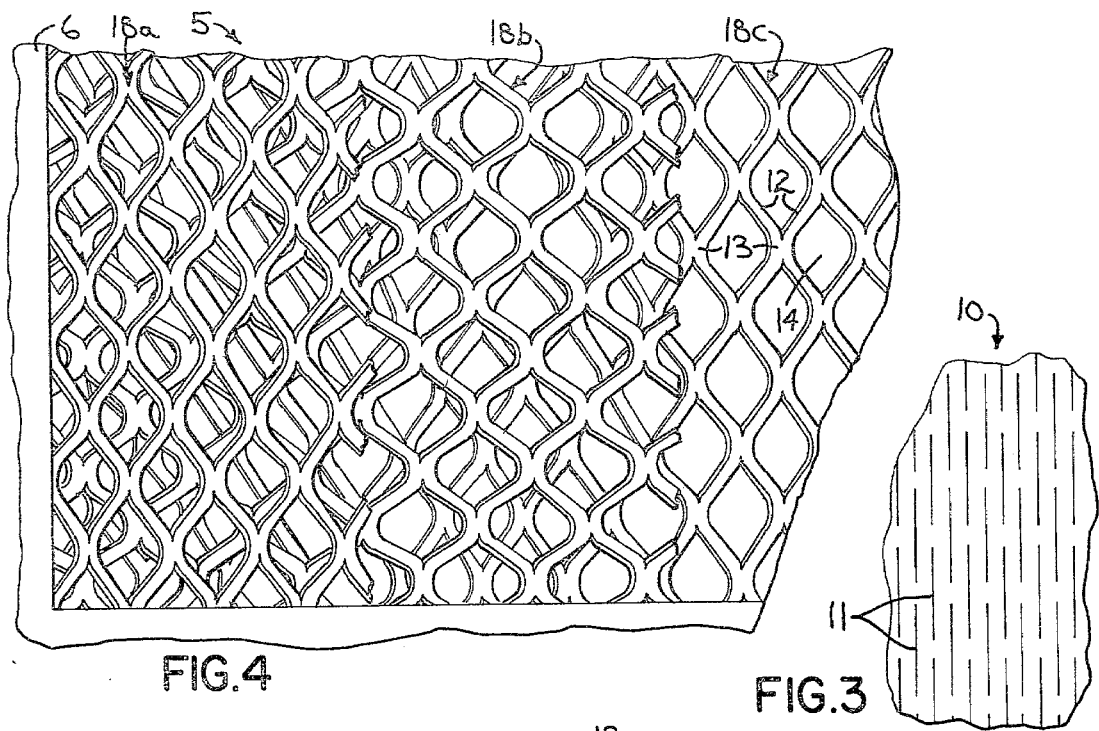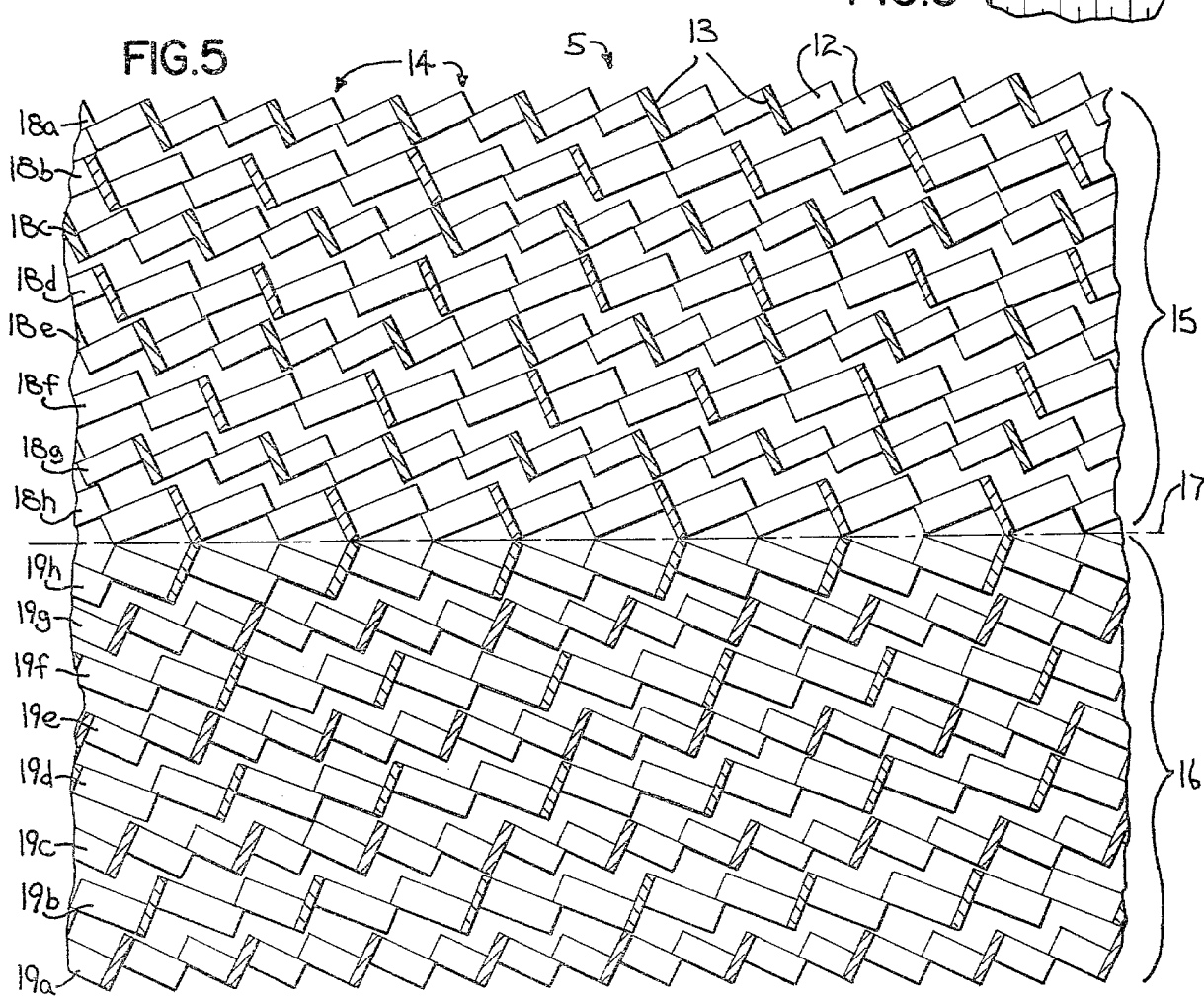

DEVICE FOR CONDITIONING AIR WITH IMPROVED GAS-LIQUID CONTACT PAD

U.S. PRIOR ART OF INTEREST

| Number | Inventor | Issue Date |
| --- | --- | --- |
| 2,611,298 | Rowe | Sept. 23, 1952 |
| 3,193,259 | Liebmann | July 6, 1965 |

BACKGROUND AND SUMMARY OF THE INVENTION

This invention relates to devices for conditioning air.

Gas-liquid contact pads have long been used in connection with humidification, evaporative cooling of the air in hot dry climates, etc. Such prior pads have often been constructed of multiple layers of slit and expanded media which are bonded or otherwise secured together.

Many prior pads have been utilized satisfactorily in installations where the air flow velocity through the wetted pad, usually by a fan, is from about 200–400 feet per minute. At these relatively low velocities, the size of the open mesh network of webs and baffles in each expanded layer of pad may be quite small, and yet provide a relatively high evaporative efficiency and low resistance to air flow. For example, many prior pads have been provided with a pattern of about 10-47-20, where:

(a) 10 is the number of transverse slits cut per 8" of width of the media before expanding;

(b) 47 is the number of rows of transverse slits cut per 8" of length of the media before expanding; and (c) 20 is the number of individual expanded cells per 8" of length of media after longitudinal expansion of the slit media.

In addition, these prior pads have been constructed so that each slit and expanded layer is turned around to face in the opposite direction from its directly adjacent layer to provide a series of individual layers wherein the baffles alternately face in opposite directions relative to the air flow and to each other.

Prior pads with layers of the above pattern and baffles orientation have been found to have, in the above indicated range of air velocities, evaporative efficiencies of about 70%–90% and air flow resistances of about 0.10–0.30 inches of water. This has previously been considered to be very adequate in many uses of such pads.

In recent years, air conditioning has become extremely popular and almost a necessity in geographic regions having very high summer temperatures. Air conditioners of the refrigeration type using an air-cooled condenser are very prevalent, but they use a substantial amount of energy. In today's energy conscious world, it has become desirable to increase the efficiency of air conditioners as much as possible. One way to accomplish this is to provide pre-cooling for the air just prior to its passing over the condenser coils of the air conditioner.

It is a known fact that many fans used in forcing air over an air conditioner's condenser coils are not designed to operate against a high resistance. These fans are intended to create an air flow through the unit in the velocity range of about 500–700 feet per minute. It has been found tht when the above-described prior gas-liquid contact pads are positioned at the air intake to the condenser coils for pre-cooling the latter, and with the high air flow velocities used for air conditioning, the evaporative efficiency of such pads tends to drop substantially, and the air flow resistance also increases, as compared to the efficiency and resistance of low air flow installations.

The present invention is based on the discovery of a unique construction of gas-liquid contact pad which has been found to satisfy the requirements for evaporative pre-cooling of condenser coils of an air conditioner in that the best possible evaporative efficiency is obtained with a minimum of air flow resistance. The improvement is expected to be applicable to other pad uses, such as humidification, as well.

In accordance with the inventive concept, a device for conditioning air has a pad formed of a plurality of layers of slit and expanded metal or other suitable media, with the pad having a plurality of groups of layers therewithin. Each layer within a particular group of layers has its baffles oriented to face in the same direction, while each group is turned around to face in the opposite direction from its directly adjacent group so that the baffles of one group face oppositely to the baffles of the next adjacent group. Such a construction is believed to reduce air turbulence as compared to the alternately reversed baffle orientation of each individual layer of the above-described prior pads.

In addition, means are provided to prevent nesting of adjacent layers within each group of layers. Alternate layers within each group are expanded to a slightly different degree so that the various elements making up each layer support the elements of adjacent layers in spaced unnested relationship.

The dimensions of the expanded cells are preferably substantially greater than those of the above-described known prior pads to better accommodate higher air velocities.

BRIEF DESCRIPTION OF THE DRAWINGS

The invention is illustrated in the accompanying drawings showing the preferred embodiment presently contemplated by the inventor.

In the drawings:

FIG. 3 is a fragmentary plan view of a slit but unexpanded sheet of media from which the pad layers are formed;

FIG. 4 is a fragmentary front view of the pad of the invention, with only the outermost three layers of one group shown and with the layers broken away for purposes of clarity; and FIG. 5 is a fragmentary horizontal sectional view through the pad and showing the plurality of groups of layers.

DESCRIPTION OF THE PREFERRED EMBODIMENT

Figure 1:
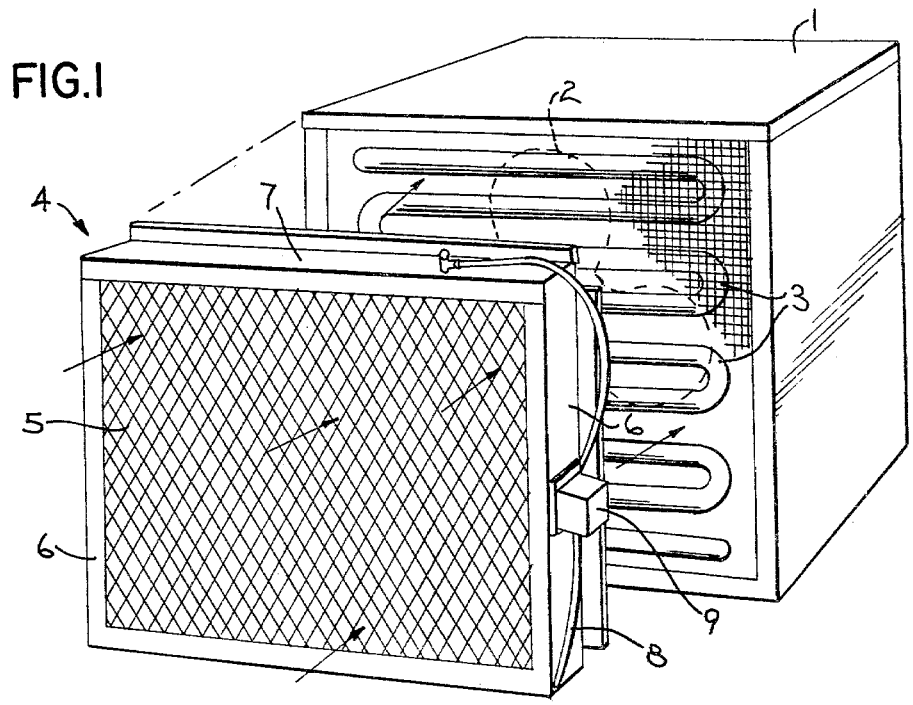
FIG. 1 is an exploded schematic perspective view of an air conditioner having the concepts of the invention applied thereto.

As shown in FIG. 1, in the present embodiment the concepts of the invention are adapted for use with a refrigeration type air-conditioner 1 having the usual well-known parts including a suitably operated fan 2 which draws air in through condenser coils 3, usually at a velocity of about 500–700 feet per minute.

It is desirable to pre-cool coils 3 to increase the efficiency of the unit. For this purpose, a precooler 4 is adapted to be attached to the air intake side of air conditioner 1, closely adjacent coils 3. Precooler 4 is shown as generally including an evaporative pre-cooler pad 5 held in a frame 6 and having the usual water distributor 7 disposed along its top edge. Distributor 7 is supplied with water through a suitable water line 8 having the usual control valve 9 therein. As water flows downwardly by gravity through pad 5, air (represented by the arrows) flows through and is evaporatively pre-cooled by contact with the water before contacting coils 3. A drain, not shown, is disposed along the bottom of pre-cooler 4 to receive any remaining water which has not evaporated by contact with the air.

In the present embodiment, pad 5 comprises a body formed of a plurality of parallel layers of slit and expanded metal, such as aluminium, which are suitably coated and bonded together in any well-known manner. There are many devices for slitting and expanding metal foil, such as is illustrated in the above-identified U.S. Pat. No. 2,611,298.

Figure 2:
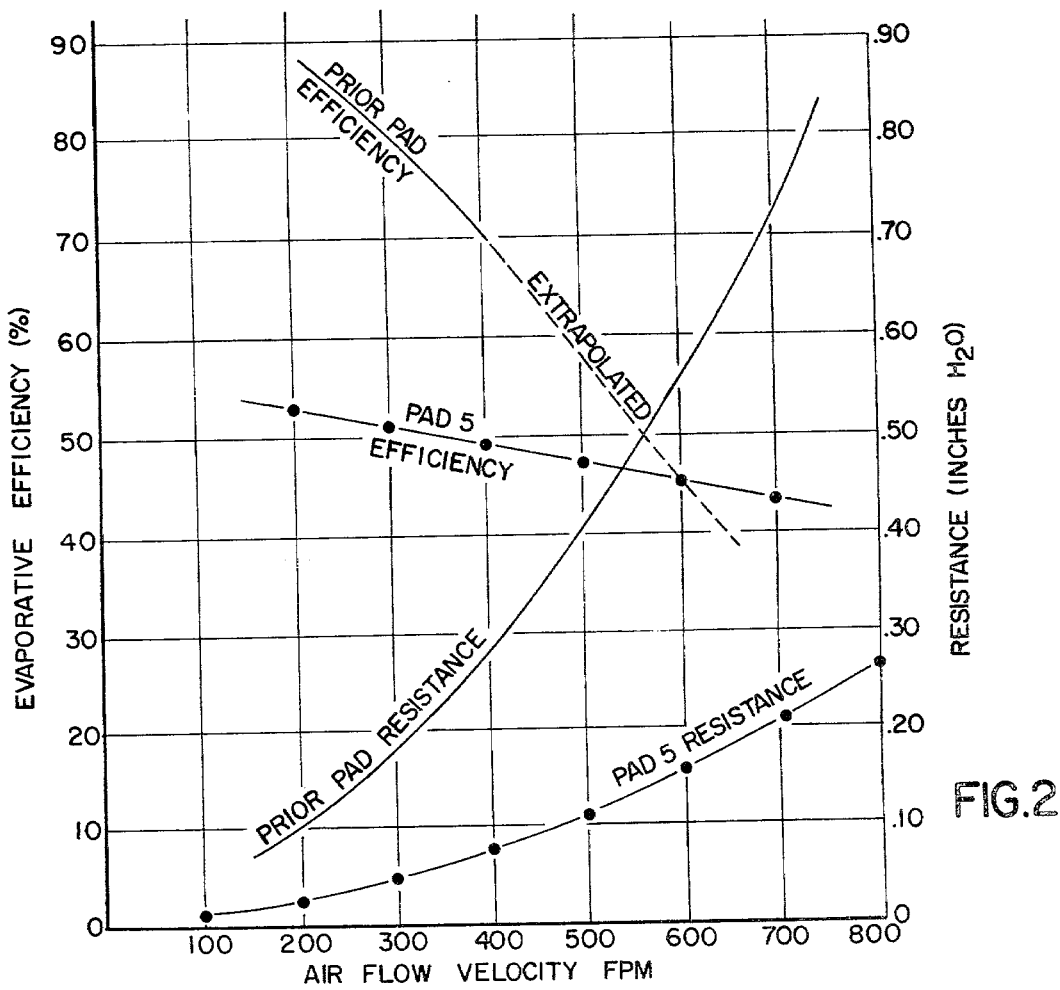
FIG. 2 is a graph illustrating the relative evaporative efficiencies and air flow resistances of a prior known gas-liquid contact pad and the pad of the invention.

FIG. 2 illustrates the efficiency and resistance characteristics of some prior metal pads, such as those used in the humidifier of the above-mentioned U.S. Pat. No. 3,193,259. Such pads are described in greater detail above and comprise multiple slit and expanded layers of relatively small pattern or cell size wherein the baffles of each adjacent layer are reversed in direction. As can be seen in the graph in the range of air flow velocities of 200-400 feet per minute (fpm), which is what these prior pads were designed for, the evaporative efficiency drops from about 90% to 70% as the velocity increases. Likewise, the resistance to air flow rises from about 0.10 to about 0.28 inches of water. The curves are such that as the air flow velocity increases beyond 400 fpm and up to approximately 700 fpm, it is expected that the efficiency will continue to sharply decrease (shown extrapolated) and it is known that the resistance will sharply continue to increase.

The pre-cooler pad 5 is formed from a plurality of sheets 10 of media (FIG. 3). During manufacture, each sheet 10 is usually in the form of a roll which passes through a slitter to create a pattern of staggered slits 11 which are subsequently planularly expanded longitudinally to form the final layer. Referring to FIG. 4, and for illustrative purposes, each expanded sheet of the entire pad comprises an open mesh network of a multiplicity of webs 12 which extend between and connect channel-like baffles 13 to form open cells 14. Both webs 12 and baffles 13, but especially the latter, are inclined at an angle to the general plane of the layer. The terminal portions of webs 12 provide flange-like sides of baffles 13, the width of the latter usually being twice the width of the webs.

In accordance with one aspect of the invention, pad 5 is formed of a plurality of planular generally flat layers of the slit and expanded media, with the pad having a plurality of discrete groups of layers therewithin. The planes of the layers are all parallel to each other. The embodiment of FIG. 5 illustrates a pad 5 having two groups 15 and 16 of layers, with the two groups joined along a central plane 17. In this embodiment, each group comprises 8 individual layers, with the layers of upper group 15 identified as 18a through 18h and the layers of lower group 16 identified as 19a through 19h. All the layers within each group 15, 16 are expanded in the same planular direction so that they are identically oriented.

Each layer within a particular group of layers has its baffles oriented to face in the same direction, while each group is turned around to face in the opposite direction from its directly adjacent group so that the baffles of one group face oppositely to the baffles of the next adjacent group. Thus, and referring to FIG. 5, all baffles 13 in each group 15 or 16 face in the same direction within their respective group. The baffles are also generally parallel within each group. At the juncture or interface between groups 15 and 16, represented by plane 17, the groups and thus the baffle orientation reverses. The result is that the parallel baffles 13 within each group 15 or 16 are disposed at an obtuse angle to the parallel baffles 13 of the other group.

In view of the similar orientation of the elements of each layer within each group 15 or 16, adjacent layers 18 or 19 within the respective group might tend to nest and thus undesirably reduce the available area for air-water impingement. To prevent this, means are provided to maintain such adjacent layers in unnested condition. In the present embodiment, this is accomplished by planularly expanding the cells of adjacent layers within each group by a slightly different amount. Preferably, and from at least a manufacturing cost standpoint, the degree of expansion of each series of alternate layers within a group is the same, but different in degree from the series of layers inbetween.

Referring especially to FIG. 4, the amount of horizontal expansion of layers 18a and 18c is less than the amount of horizontal expansion of layer 18b therebetween. The expansion of layer 18d (not shown in FIG. 4, but shown in FIG. 5) corresponds to that of layer 18b and is greater than that of layers 18a and 18c.

In the preferred form where alternate layers are equally expanded, which is the case in the embodiment of FIGS. 4 and 5, theoretically layer 18c could be aligned so that its parts are directly behind layer 18a. In such case, layer 18c would not be visible in the left portion of FIG. 4. Therefore, for purposes of illustration and also because from a practical standpoint at least some of the alternate layers are often not exactly aligned, the baffles of layer 18c are shown as horizontally offset from those of layer 18a within the plane of the pad.

A preferred pattern for the pad of the present embodiment is as follows:

|  |  |  |
|---|---|---|
|  | Layer 18a | 7-25-14 |
|  | 18b | 7-25-11 |
|  | 18c | 7-25-14 |
|  | 18d | 7-25-11 |
| Group 15 | 18e | 7-25-14 |
|  | 18f | 7-25-11 |
|  | 18g | 7-15-14 |
|  | 18h | 7-25-11 |
| Plane 17 |  |  |
|  | 19h | 7-25-11 |
|  | 19g | 7-25-14 |
|  | 19f | 7-25-11 |
|  | 19e | 7-25-14 |
| Group 16 | 19d | 7-25-11 |
|  | 19c | 7-25-14 |
|  | 19b | 7-25-11 |
|  | 19a | 7-25-14 | where:
(a) 7 is the number of transverse slits 11 cut per 8" of width of sheet 10 before expanding;

(b) 25 is the number of rows of transverse slits 11 cut per 8" of length of sheet 10 before expanding; and (c) 11 and 14 are the number of individual expanded cells 14 per 8" of length of sheet 10 after longitudinal expansion of the slit sheet.

In the above embodiment, alternate layers within each group are equally expanded. It should be pointed out that pattern 7-25-14, which has more cells per 8" sheet length than pattern 7-25-11, has less expansion and narrower cells than the latter pattern. It should also be noted that directly adjacent facing layers 18h and 19h at the interface 17 between groups 15 and 16 have the same expansion pattern, namely 7-25-11. This is possible because the reversal of orientation of these layers prevents nesting thereof.

The degree of difference of expansion need not be large to accomplish the intended purpose, the present embodiment providing a difference of less than 0.2" expansion between adjacent layers of a group, even with the larger size cells of the preferred pad.

FIG. 2 also illustrates the efficiency and resistance characteristics of the pad discussed in detail above. As to efficiency, it has been found that pad 5 is much less efficient at low air velocities (for which it is not intended) in the range of about 200-400 fpm than the previously discussed prior pad. However, the efficiency curve of pad 5 is demonstratedly flatter and approaches and ultimately exceeds that of the prior pad at some point in excess of operative velocities of about 400 fpm. Thus, at these higher velocities, pad 5 closely approximates or exceeds the efficiency of the prior pad. being in the range of about 40%-50%.

As to the resistance, FIG. 2 shows that pad 5 has less resistance than the prior pad from about 150 fpm to about 700 fpm. In view of the fact that the resistance curves diverge sharply as air velocity increases, and the curve for pad 5 remains relatively uniform all the way out to 800 fpm, pad 5 will have substantially less resistance than the prior pad in the entire operating range. This resistance is about 0.10 to 0.20 inches of water in the range of about 500-700 fpm.

The gas-liquid contact pad disclosed herein provides, with devices for conditioning air requiring high air flow velocities, an evaporative efficiency which is at least equivalent to prior pads used for low velocity applications, while providing air flow resistance substantially lower than such prior pads.

Various modes of carrying out the invention are contemplated as being within the scope of the following claims particularly pointing out and distinctly claiming the subject matter which is regarded as the invention:

I claim:

1. For use in conjunction with a device for conditioning air wherein said device has a means for providing air flow therethrough at an operative velocity in excess of about 400 feet per minute, a gas-liquid contact pad being adapted for downward gravity flow of water therethrough and comprising:
   (a) a body formed of a plurality of vertical layers of generally flat planular sheets the planes of which are all parallel to each other, and with said layers being slit and planularly expanded to form a multiplicity of inclined baffles and connecting webs forming cell-like openings,
   (b) said pad having a plurality of discrete groups of individual layers therein,
   (c) all the layers within each discrete group of layers being expanded in the same planular direction so that they are identically oriented,
   (d) the baffles in all the layers within each discrete group of layers being oriented to face in the same direction and being generally parallel to each other,
   (e) each said group of layers being oriented to face in the opposite direction from its directly adjacent group so that the baffles of one said group face oppositely to the baffles of the next adjacent group.

2. The gas-liquid contact pad of claim 1 wherein the baffles of one discrete groups of layers are disposed at an obtuse angle to the baffles of the next adjacent group.

3. The gas-liquid contact pad of claim 1 which includes layer nesting preventing means comprising a different degree of planular expansion of the cells in directly adjacent layers within a said discrete group.

4. The gas-liquid contact pad of claim 3 wherein the degree of cell expansion of the innermost facing layers of adjacent groups at the interface between said adjacent groups is the same for both said innermost layers.

5. The gas-liquid contact pad of claim 3 or 5 wherein the difference in degree of cell expansion between directly adjacent layers within a said discrete group is less than 0.2":

6. The gas-liquid contact pad of claim 3 or 5 in which the degree of cell expansion of alternate layers within a said discrete group of layers is the same, but different in degree than that of the layers between said alternate layers.

7. The gas-liquid contact pad of claim 6 wherein:
   (a) the evaporative efficiency of said pad in the air flow range of about 500-700 feet per minute is about 40% to 50%,
   (b) and the resistance to air flow of said pad in said air flow range of about 500-700 feet per minute is about 0.10 to 0.20 inches of water.

* * * * *

UNITED STATES PATENT AND TRADEMARK OFFICE
CERTIFICATE OF CORRECTION

PATENT NO. : 4,338,266
DATED : July 6, 1982
INVENTOR(S) : JOHN W. FLOWER

It is certified that error appears in the above-identified patent and that said Letters Patent are hereby corrected as shown below:

Column 1, Line 67; After "found" delete "tht" and substitute therefor ----that----

Column 4, Line 13; Delete "groups" and substitute therefor ----group----

Column 4, Line 56; Delete "7-15-14" and substitute therefor ---- 7-25-14 ----

Column 6, Line 27; Delete "groups" and substitute therefor ----group----

Column 6, Line 37; Delete the numeral "5" and substitute therefor ----4----

Column 6, Line 41; Delete the numeral "5" and substitute therefor ----4----

Signed and Sealed this

Fifth Day of October 1982

[SEAL]

Attest:

GERALD J. MOSSINGHOFF

Attesting Officer

Commissioner of Patents and Trademarks